United States Patent
Stockall et al.

(10) Patent No.: US 12,295,423 B2
(45) Date of Patent: May 13, 2025

(54) ELECTRICAL CHARGER DEVICE FOR AN ELECTRONIC CIGARETTE

(71) Applicant: JT International SA, Geneva (CH)

(72) Inventors: Adrian Peter Stockall, Grand-Saconnex (CH); Ronald Van Tuijl, Geneva (CH); David Vargas, Geneva (CH)

(73) Assignee: JT International S.A. (CH)

( * ) Notice: Subject to any disclaimer, the term of this patent is extended or adjusted under 35 U.S.C. 154(b) by 312 days.

(21) Appl. No.: 17/784,226

(22) PCT Filed: Dec. 11, 2020

(86) PCT No.: PCT/EP2020/085848
§ 371 (c)(1),
(2) Date: Jun. 10, 2022

(87) PCT Pub. No.: WO2021/116456
PCT Pub. Date: Jun. 17, 2021

(65) Prior Publication Data
US 2023/0042080 A1     Feb. 9, 2023

(30) Foreign Application Priority Data

Dec. 12, 2019   (EP) ..................... 19215801

(51) Int. Cl.
*A24F 40/90*      (2020.01)
*A24F 40/53*      (2020.01)
(Continued)

(52) U.S. Cl.
CPC .............. *A24F 40/90* (2020.01); *A24F 40/53* (2020.01); *A24F 40/65* (2020.01); *G06F 21/32* (2013.01)

(58) Field of Classification Search
CPC .......... A24F 40/90; A24F 40/53; A24F 40/65; G06F 21/32
(Continued)

(56) References Cited

U.S. PATENT DOCUMENTS

2009/0320863 A1   12/2009   Fernando et al.
2015/0136153 A1   5/2015    Lord
(Continued)

FOREIGN PATENT DOCUMENTS

CN    105848503 A    8/2016
CN    108451029 A    8/2018
(Continued)

OTHER PUBLICATIONS

International Search Report for PCT/EP2020/085848 dated Jan. 15, 2021. 3 pgs.
(Continued)

*Primary Examiner* — Kerri L McNally
(74) *Attorney, Agent, or Firm* — Lerner David LLP

(57) ABSTRACT

There is provided an electrical charger device and method performed by an electrical charger device for an electronic cigarette. The electrical charger device comprises an interface configured to establish a wireless communicative pairing between the electrical charger device and an electronic cigarette, the wireless communicative pairing being establishable when the electronic cigarette and the electrical charger device are within communication range of one another; and a controller configured to acquire data related to the electronic cigarette, and configured to prohibit use of the electronic cigarette based on the acquired data and configurable rules.

19 Claims, 7 Drawing Sheets

(51) Int. Cl.
*A24F 40/65* (2020.01)
*G06F 21/32* (2013.01)

(58) Field of Classification Search
USPC .......................................................... 340/501
See application file for complete search history.

(56) References Cited

U.S. PATENT DOCUMENTS

| | | | |
|---|---|---|---|
| 2015/0181945 A1* | 7/2015 | Tremblay | A24F 40/60 |
| | | | 131/328 |
| 2015/0224268 A1 | 8/2015 | Henry et al. | |
| 2015/0272223 A1 | 10/2015 | Weigensberg et al. | |
| 2018/0043114 A1* | 2/2018 | Bowen | A24F 40/65 |
| 2019/0053540 A1* | 2/2019 | Baker | A24F 40/51 |
| 2019/0058970 A1 | 2/2019 | Baker et al. | |
| 2019/0369127 A1 | 12/2019 | Fu et al. | |
| 2019/0380388 A1* | 12/2019 | Amorde | A61M 16/18 |
| 2020/0054071 A1* | 2/2020 | Ouyang | G06V 40/172 |
| 2020/0137570 A1* | 4/2020 | Skoda | H04L 63/0861 |
| 2020/0265133 A1* | 8/2020 | Mokhasi | G06Q 20/4012 |
| 2020/0315259 A1* | 10/2020 | Hubbard | A61M 15/06 |
| 2020/0352249 A1* | 11/2020 | Achtien | A61M 15/0066 |

FOREIGN PATENT DOCUMENTS

| | | |
|---|---|---|
| CN | 110522088 A | 12/2019 |
| JP | 2008197895 A | 8/2008 |
| JP | 2009015422 A | 1/2009 |
| JP | 2011517567 A | 6/2011 |
| JP | 2015517312 A | 6/2015 |
| JP | 2017512459 A | 5/2017 |
| KR | 20190135759 A | 12/2019 |
| WO | 2019126805 A1 | 6/2019 |
| WO | 2019162161 A1 | 8/2019 |

OTHER PUBLICATIONS

Search Report dated Jan. 6, 2025 from the Office Action for Chinese Application No. 202080086494.3 Issued Jan. 22, 2025, pp. 1-3.

* cited by examiner

ELECTRICAL CHARGER DEVICE FOR AN ELECTRONIC CIGARETTE

CROSS-REFERENCE TO RELATED APPLICATIONS

The present application is a national phase entry under 35 U.S.C. § 371 of International Application No. PCT/EP2020/085848, filed Dec. 11, 2020, which claims priority to European Application No. 19215801.2 filed Dec. 12, 2019, the disclosures of which are incorporated herein by reference.

FIELD OF THE INVENTION

The present invention relates to electrical charger device for electronic cigarettes, such as electrical chargers able to communicate with electronic cigarettes.

BACKGROUND

Electronic cigarettes generally include a battery as a power source. This provides the power to operate the electronic cigarette. These batteries are typically rechargeable.

In order to charge the battery of an electronic cigarette, the electronic cigarette is connected to an external power source. This may be as simple as a plug connected to a mains electricity socket and a cable connected between the plug and the electronic cigarette. Alternatively, an electrical charger device may be provided in the form of a hub to which one or more electronic cigarettes are attachable in order to charge.

Additionally, electrical charger devices may themselves have a battery to which the electronic cigarette is able to be attached. This allows the electrical charger to be mobile and taken with a user to allow charging while on the move.

While electrical charger devices provide users of electronic cigarettes with the ability to use electronic cigarette by providing power, there are occasions where use of electronic cigarette should be avoided. This may include when a user is in a location that restricts the use of electronic cigarettes, or when a user wishes to limit their use of electronic cigarettes in a particular location or at particular times of day.

A user is able to decide when to use and when not to use electronic cigarette based on their choices and any particular restrictions in place. However, accidental use can still occur, such as when a user has not noticed or been informed about restricted use in a particular location.

A potential solution to this issue is provided by known electrical chargers. Such chargers provide a container to which an electronic cigarette is inserted in order to charge, and also provides a door with which to close the container. This door is then lockable.

The solution only works when the electronic cigarette is already contained within the electrical charger however. Should the electronic cigarette be outside of the electrical charger, accidental use can still occur. An improved means of restricting use of electronic cigarette is therefore needed.

SUMMARY OF INVENTION

According to a first aspect, there is provided an electrical charger device, comprising: an interface configured to establish a wireless communicative pairing between the electrical charger device and an electronic cigarette, the wireless communicative pairing being establishable when the electronic cigarette and the electrical charger device are within communication range of one another; and a controller configured to acquire data related to the electronic cigarette, and configured to prohibit use of the electronic cigarette based on the acquired data and configurable rules.

This allows use of an electronic cigarette to be prohibited and controlled without needing to provide a wired or any form of physical connection between an electrical charger and an electronic cigarette. Additionally, by using configurable rules, a user may be able to influence or set when the use of the electronic cigarette is to be prohibited. This reduces the chance of accidental use of electronic cigarette when use is not intended. This is achieved by removing the ability of the user to use the electronic cigarette without taking a further step for example.

By the phrase "prohibit use" we intend to mean that the ability of electronic cigarette to generate aerosol or vapour for the user to draw or inhale from the electronic cigarette is stopped. This may be due to a heater of the electronic cigarette being switched off, disabled, restricted and/or inhibited while other functionality of the electronic cigarette is maintained due to one or more other functionalities of electronic cigarette being restricted. Of course, other functionality may also be restricted as well in various examples.

The phrase "within communication range" is intended to mean the distance over which the electrical charger is able to transmit and receive data and/or to communication with one or more other devices.

The acquired data may include data related to a user of the electronic cigarette. This may include one or more of the age, gender, health statistics, occupation and/or electronic cigarette usage behaviour.

The configurable rules may include any arrangement or combination of factors that may cause prohibition of the use of electronic cigarettes to be applied. Typically, the configurable rules include prohibiting use of the electronic cigarette based on a distance between the electronic cigarette and the electrical charger device. This allows use of the electronic cigarette to be prohibited relative to distance between the electrical charger device and the electronic cigarette.

The controller may be configured to prohibit use of the electronic cigarette if the distance is below a predetermined threshold. This means a zone can be created within which use of electronic cigarette for its primary purpose (i.e. for a user to use to "smoke" by drawing output from the electronic cigarette) is not possible.

The acquired data may alternatively or additionally include any data related to the electronic cigarette, such as its maker, model, age or type. Typically, the acquired data is an ID tag associated with the electronic cigarette, and the controller is configured to compare the acquired ID tag with an ID tag stored in memory in the electrical charger device. This allows a bespoke approach to be taken with each electronic cigarette for which an ID tag is stored in memory in the electrical charger device. This means different action can be taken for different electronic cigarettes, such as prohibiting use based on different factors or configurable rules.

The controller being configured to prohibit use of the electronic cigarette may be based on the acquired ID tag matching the ID tag stored in memory in the electrical charger device. Whether the acquired ID tag matches or does not match an ID tag stored in memory of the electrical charger device is determined by the comparison the controller may be configured to carry out. Of course, if the acquired ID tag and the ID tag stored in memory of the electrical charger device do not match (i.e. the comparison results in a negative match), the controller may be configured to allow use (i.e. not to prohibit use) of the electronic cigarette. Further, this means that the electrical charger device will only take action where the ID tag of an electronic cigarette is recognised (there is a match, i.e. the comparison results in a positive match), and will not take action when the ID tag of an electronic cigarette is not recognised, allowing use of non-recognised electronic cigarettes to be unaffected by the acquired data and configurable rules. This could of course be reversed to prohibit use when there is a negative match and to allow use when there is a positive match.

The controller may be configured to send a message to a computing device based on the comparison. This allows a report or other data to be provided to an external device to allow further action to be taken or for data to be recorded. The message may be sent when the comparison finds the ID tag of the electronic cigarette is not recognised. In this situation a message may not be sent when the comparison finds the ID tag is recognised. Alternatively, the reverse may apply, such as when the comparison finds the ID tag of the electronic cigarette is recognised, a message may be sent and in such a situation, if the comparison finds the ID tag of the electronic cigarette is not recognised, a message is not sent.

By sending a message to a computing device based on the comparison it is possible to provide a user with a choice on whether to prohibit use of the electronic cigarette. For example, if the comparison result is that the ID tags match, the charger may issue a message asking for approval to lock (i.e. prohibit use of) the electronic cigarette. If user input is received by the charger in response (for example via a mobile/cellular phone), the charger may opt to send or not send a command to electronic cigarette to prohibit use based on the response. Alternatively, if no response is received to the message, the charger may proceed with sending a command to prohibit use of the electronic cigarette since this may be the default action already set by configurable rules. Alternatively, or additionally, the charger may upload all data to a server to analyse user's behaviour for further use. As such, the computing device may be a mobile (i.e. cellular) phone or a server.

The ID tags stored in memory may comprise ID tags for electronic cigarettes authorised for use with the electrical charger device. This allows use of multiple electronic cigarettes to be controlled using a single electrical charger device.

Typically, when storing one or more ID tags for electronic cigarettes authorised for use with the electrical charger device the controller is configured to perform a registration process of the electronic cigarette with the electrical charger device. The registration process may include establishing communication between the electrical charger device and electronic cigarette, the electrical charger device obtaining an ID tag of the electronic cigarette and storing the ID tag in memory. The controller may be configured to carry out this process. Further, the registration process may include providing a PIN code at the electrical charger device, electronic cigarette or third device (such as a mobile phone or computer) or providing a user's biometric data, such as a fingerprint.

The controller may be configured to prohibit use of the electronic cigarette when the electrical charger device is in a first mode; and wherein the controller may be further configured to: store user biometric data; acquire biometric data from a user seeking to charge the electronic cigarette; establish whether the acquired biometric data matches the stored biometric data; and activate the first mode based on the result of the match. This allows use of the electronic cigarette to be controlled based on the user. This could result in use being prohibited for one user but allowed for another, meaning that the ability to use the electronic cigarette can be tailored to a specific user or user group and individuals within that group. This also allows the user to control when the electrical charger device is able to prohibit use of the electronic cigarette. This provides the user with an override capability, meaning the user has greater control. When storing the user biometric data, the controller may be configured to store the user biometric data in memory, such as memory of the electrical charger device.

The first mode may be activated when the acquired biometric data matches the stored biometric data. Accordingly, the first mode may not be activated when the acquired biometric data does not match the stored biometric data. Of course, this may be reversed, meaning the first mode may be activated when the acquired biometric data does not match the stored biometric data. This would mean the first mode may not be activated when the acquired biometric data does match the stored biometric data. This process allows use of the electronic cigarette to be prohibited when two conditions are met. These are: the electronic cigarette is already in a wireless communicative pairing with the electrical charger device, which may include having previously been registered with the electrical charger device, and if such registration has not previously been carried out, may further include registering the electronic cigarette with the electrical charger device by a process such as the storing of an ID tag as set out above; and the user having set the electrical charger device in a mode to automatically scan for electronic cigarettes nearby by means of wireless communication, the user then enters biometric data, such as a fingerprint, to activate the process of prohibiting use, such as by touching a sensor or button. Should both conditions be met, then the electrical charger device may prohibit use of the electronic cigarette.

The controller may be further configured to: store user biometric data; acquire biometric data from a user seeking to charge the electronic cigarette; establish whether the acquired biometric data matches the stored biometric data; allow selection, by a user and based on the result match, of a threshold distance within which to prohibit use; receive a threshold distance selection; and set the threshold distance based on the received threshold distance. This allows the area in which use of the electronic cigarette is prohibited to be selected by a user. This means a user can tailor the application of this to their needs making the electrical charger device more user-friendly.

The selected distance may be set by any suitable means, such as by the electrical charger device carrying out a distance calculation. Typically however, the controller is configured to set the selected distance by adjusting the power supplied to a wireless transceiver. This causes the distance over which the use of the electronic cigarette is able to be prohibited to the distance over which the wireless transceiver is able to scan and/or transmit and receive data from one or more other devices. The wireless transceiver may be used for establishing the wireless communicative pairing. This may be achieved by the wireless transceiver typically providing the interface for the wireless communicative pairing. By increasing the power supplied to the wireless transceiver, the wireless transceiver may be able to scan over a greater distance. Correspondingly, by decreasing the power supplied to the wireless transceiver, the wireless transceiver may be able to scan over a lesser distance.

As indicated above, the biometric data may comprise a fingerprint. Other biometric data may be used instead or in addition. This may include an iris scan and/or facial recognition. This allows a user to be uniquely identified and therefore allow actions specific to an individual user to be applied by the electrical charger device.

This means the electrical charger device may further comprise a biometric sensor configured to receive user biometric data. Of course, user biometric data is able to be provided to the electrical charger device by other means, such as from the electronic cigarette or from a further device such as a computing device (a mobile phone for example).

The controller may be further configured to update the stored user biometric data when the owner of the electronic cigarette and/or electrical charger device is changed. This allows ownership of the electrical charger device and/or the electronic cigarette to change without a loss of functionality of one or other (or of each).

The controller being further configured to send an ID tag associated with the electrical charger device to the electronic cigarette. This may be used to verify the ability of the electrical charger device to prohibit use of the electronic cigarette.

According to a second aspect, there is provided a method performed by an electrical charger device for an electronic cigarette, the method comprising: establishing a wireless communicative pairing establishable when the electronic cigarette and the electrical charger device are within communication range of one another; acquiring data related to the electronic cigarette; and prohibiting use of the electronic cigarette based on the acquired data and configurable rules.

BRIEF DESCRIPTION OF FIGURES

An example electrical charger device and method for charging an electronic cigarette with an electrical charger device are described in detail below with reference to the accompanying figures, in which.

DETAILED DESCRIPTION

As outlined above, examples described herein seek to provide an electrical charger device that restricts use of an electronic cigarette when that electronic cigarette is within a predetermined distance of the electrical charger device. Various examples of such an electrical charger device are set out below, along with details of a corresponding electronic cigarette and example processes performable by that electrical charger device.

Figure 1:
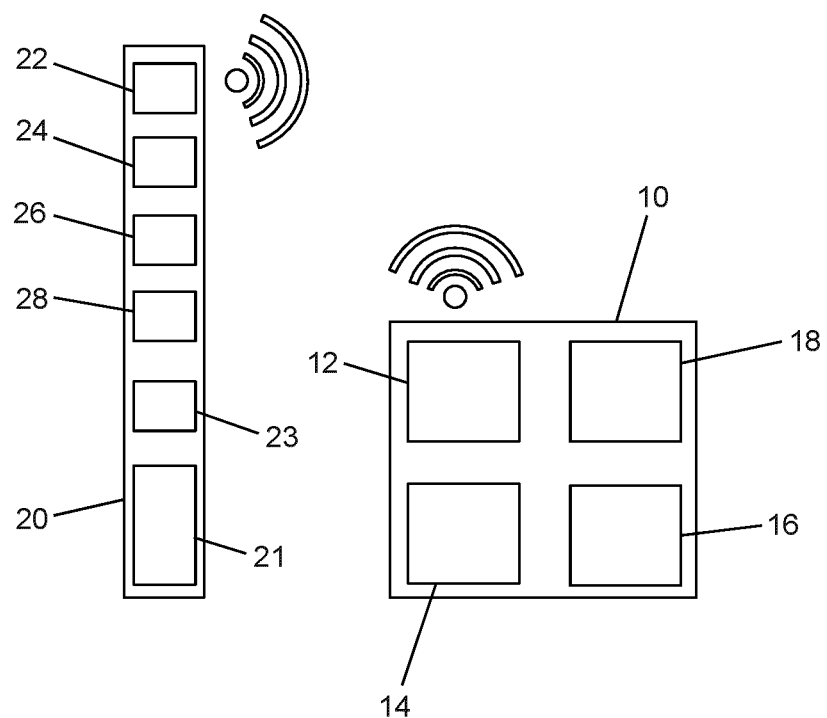
FIG. 1 shows a schematic of an example electrical charger device and example electronic cigarette.

An electrical charger device according to an example is generally illustrated at 10 in FIG. 1. This includes a wireless transceiver 12 and a controller 14. In this example, the electrical charger device also includes a memory 16 and a biometric sensor 18. The memory and the biometric sensor may not be present in other examples.

The electrical charger device 10 is powered either by an external power source (not shown) or by a battery (not shown) located within the device itself. Whatever form the power source takes, the power source provides power to the various components of the electrical charger device.

In addition to the components of electrical charge device 10 outlined above, the electrical charger device will also have a charging unit (not shown), which is arranged in use to charge an electronic cigarette when a suitable connection is provided between the electrical charger device and the electronic cigarette. In some examples charging may be capable of being achieved using the wireless transceiver 12 to provide wireless charging of an electronic cigarette. This would of course require the electronic cigarettes to also have the capability of wireless charging.

FIG. 1 also shows an electronic cigarette 20. In this example the electronic cigarette has a wireless transceiver 22, controller 24, heater 26 and power source 21. The electronic cigarette also has a memory 28 in this example, which may not be present in other examples. The power source is typically a battery, which in various examples is rechargeable.

In this example the wireless transceiver of the electrical charger device and/or the electronic cigarette may be a transceiver for Bluetooth, Wi-Fi, radio, 2G, 3G, 4G, 5G communication or any other form of wireless communication transceiver, such as near-field communication (NFC) or LTE communication. Of course, the wireless transceivers of the electrical charger device and the electronic cigarette are intended to be compatible with each other to allow communication between the two.

The controller of the electrical charger device and/or the electronic cigarette in this example is a processor. This is capable of receiving and issuing commands and carrying out instructions in the form of execution of code.

The electronic cigarette, which is also referred to as an e-cigarette, is typically a handheld device (i.e. the electronic cigarette may be capable of being held and supported in only one or two hands by a user). The electronic cigarette contains a heatable substance 23 that, when heated, produces vapour or an aerosol capable of being drawn from the electronic cigarette into the mouth of a user due to the structural arrangement of the electronic cigarette. The heatable substance may be a liquid or a solid, each of which either vaporise or produce an aerosol on heating or contain a constituent that vaporises of produces an aerosol on heating. For ease of reference, the whole substance is also referred to as a vaporisable substance herein.

An electrical charger device of an example, such as the electrical charger device 10 shown in FIG. 1, is able to be used to prohibit the use of an electronic cigarette of an example, such as the electronic cigarette 20 shown in FIG. 1 within a predetermined or threshold distance range of the electrical charger device. This distance range may encompass a user's home or office or car for example.

Figure 2:
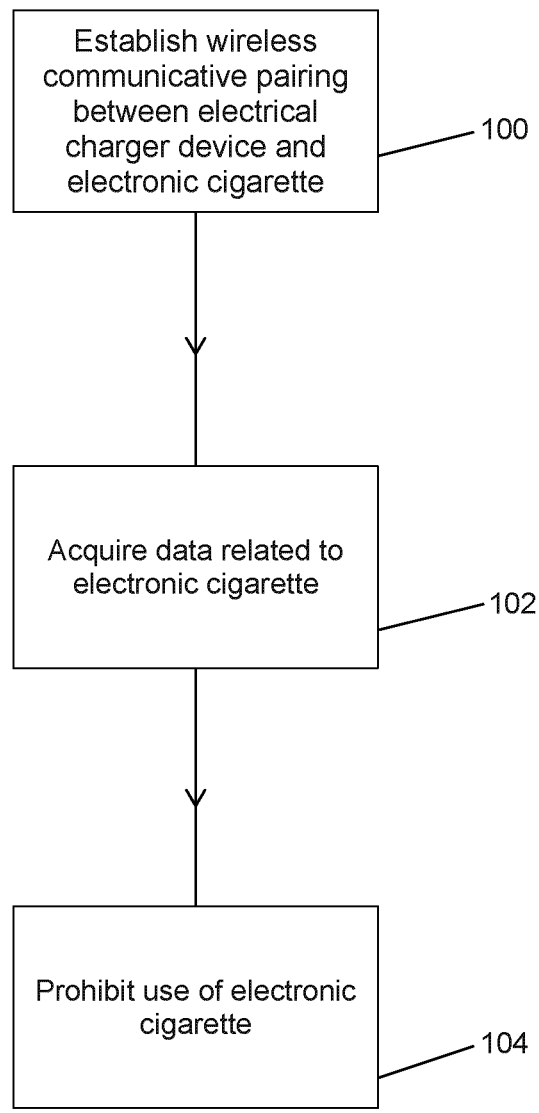
FIG. 2 shows a flow chart of an example method performed by an example electrical charger device.

To achieve use of an electronic cigarette being prohibited, a method, such as the example method set out in the flow diagram of FIG. 2 is applied. Initially, at step 100, a wireless communicative pairing is established between an electrical charger device and an electronic cigarette. Once the wireless community pairing is established, at step 102, data is acquired related to the electronic cigarette. At step 104, use of the electronic cigarette is prohibited based on the acquired data and configurable rules.

In this example, to establish wireless communicative pairing between the electrical charger device and an electronic cigarette, the electronic cigarette typically needs to be within communication range of the wireless transceiver 12 of the electrical charge device. This may not be needed in other examples. When the electronic cigarette is needed to be within communication range of the wireless transceiver a connection may be established by the wireless transceiver of the electrical charger device scanning for devices to connect to. This may be due to the wireless transceiver or electrical charger device being in a scanning mode.

Correspondingly, in order to be within communication range of the electrical charger device wireless transceiver 12, the wireless transceiver 22 of the electronic cigarette 20 needs to be able to be scanned and recognised as a potential communication source by the wireless transceiver of the electrical charge device 10. This typically requires the electronic cigarette to be within a certain distance range of the electrical charger device.

The specifics of how the pairing is established are dependent on the type of wireless communication. As such, establishing the pairing is carried out in accordance with known methods of establishing a wireless communication path between two devices. In some examples, the electrical charger device 10 has functions to enable Bluetooth communication to scan Bluetooth enabled devices and the electrical charger device 10 is configured to identify a MAC address (media access control address) of the Bluetooth enabled devices.

The scanning range of the wireless transceiver 12 of the electrical charger device 10 is a predetermined threshold, so if the electronic cigarette 20 is within the range, then it is possible to detect and establish a communication path between the electrical charger device and the electronic cigarette.

In some examples the electronic cigarette 20 and electrical charge device 10 share a logic Domain and Eco System with a unique ID and/or IP address each to enable the electrical charger device to recognise the electronic cigarette upon detection by the electrical charger device of the electronic cigarette and/or connection between the electronic cigarette and electrical charge device. In other examples, each of the electronic cigarette and electrical charger device have an ID tag (such as an RFID or an embedded MAC address) included during the manufacturing process to enable each to recognise the other. In yet further examples, a user can register one or more electronic cigarettes with a charger through an interface at the electrical charger device or on a further device capable of being connected to the electrical charger device.

In this example the electronic cigarette 20 has previously been registered with the electrical charger device 10 before the wireless communication pairing is established. However, in other examples the electronic cigarette has not been previously registered with the electrical charger device before the wireless communication pairing is established, and it is still possible to establish the wireless communication pairing.

Once the wireless communicative pairing is established, data is acquired relating to electronic cigarette 20. In various examples this is achieved by the controller 14 of the electrical charger device 10 issuing a data request command to the electronic cigarette. In this example the data request is a request for an ID tag of the electronic cigarette. This ID tag is typically stored in the memory 28 of the electronic cigarette. The requested data is then transmitted to the electrical charger device from the electronic cigarette. In other examples the data required by the electrical charger device alternatively, or in addition, includes make, model, age and/or type of the electronic cigarette and/or make, model, age and/or type of the vaporisable substance 23.

On receipt of the requested data, the controller 14 of the electrical charger device 10 carries out a determination based on the acquired data and configurable rules. Depending on the result of that determination, use the electronic cigarette 20 is prohibited.

The use of the electronic cigarette being prohibited is achieved in this example by the controller 14 of the electrical charge device 10 issuing a command to the electronic cigarette 20 to prohibit use. In this example this command is a command to disable the heater 26, thereby inhibiting the supply of heat to the vaporisable substance 23. This command is then carried out by the controller 24 of the electronic cigarette. In other examples, use of electronic cigarette may be prohibited by other means, and/or the command may include turning off the electronic cigarette, switching the electronic cigarette into a standby mode where its functionality is restricted. In various examples when use of the electronic cigarette is prohibited, the electronic cigarette may still be able to communicate with other devices such as the electrical charger device or a further computing device, and may still have all other functionality other than the ability to provide heat to the vaporisable substance.

The configurable rules are able to be predetermined or preselected. The determination of selection of the rules may be carried out by a user, may be applied as a pre-set for a mode in which the electrical charger device 10 is able to be placed, may be pre-programmed prior to sale of the electrical charger device.

In this example, the configurable rules include that use of the electronic cigarette 20 is to be prohibited when an ID tag of the electronic cigarette matches and ID tag stored in the memory 16 of the electrical charger device 10, the stored ID tag being an ID tag of electronic cigarette registered with the electrical charger device. In some examples the configurable rules can further, or alternatively, include that use of the electronic cigarette is to be prohibited when the electronic cigarette is a particular make, model, age, and/or type, and/or the vaporisable substance 23 is a particular make, model, age and/or type. In various examples, the configurable rules only include that use of the electronic cigarette is to be prohibited if the electronic cigarette establishes a wireless communicative pairing with the electrical charger device.

Figure 3:
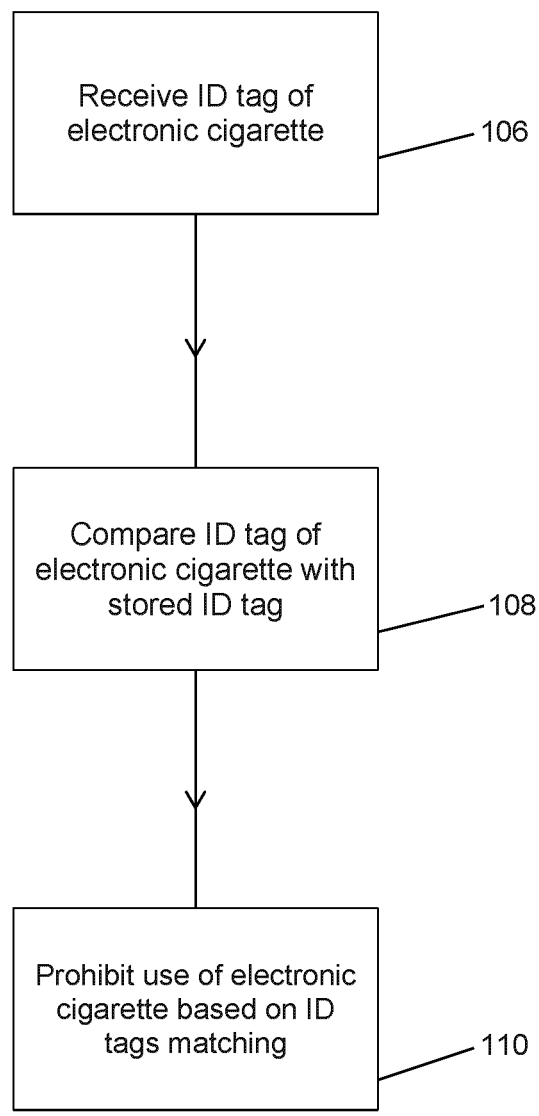
FIG. 3 shows a flow chart of a second example method performed by an example electrical charger device.

In this example, due to the configurable rules including that use of the electronic cigarette 20 is to be prohibited when an ID tag of the electronic cigarette matches a stored ID tag in the memory 16 of the electrical charge device 10 a process, such as the process shown in FIG. 3, is carried out. In this process, once an ID tag is received from the electronic cigarette at step 106, a comparison is conducted between the electronic cigarette with which the electrical charge device has established a wireless corrective pairing and any ID tags stored in the memory of the electrical charger device at step 108. At step 110, if the result of the comparison is that the ID tag of the electronic cigarette matches a stored ID tag, then the controller 14 issues a command to prohibit use of electronic cigarette.

The electrical charger device 10 may receive an ID tag from the electronic cigarette 20 in response to the wireless communicative pairing being established, in response to a request from the electrical charger device or a further device, or in response to an action taken by a user or another person.

In order to avoid use of the electronic cigarette 20 being permanently prohibited after connection to the electrical charger device 10 of this example, in various examples, when the electronic cigarette is no longer connected to the electrical charger device by the established wireless corrective pairing, use of the electronic cigarette is restored. By use of the electronic cigarette being restored, we intend to mean that heating is no longer disabled and that any other functionality of the electronic cigarette that was restricted, disabled, stopped or inhibited is also restored. This means that use of the electronic cigarette is only prohibited within a certain distance from a range of the electrical charger device.

Figure 4:
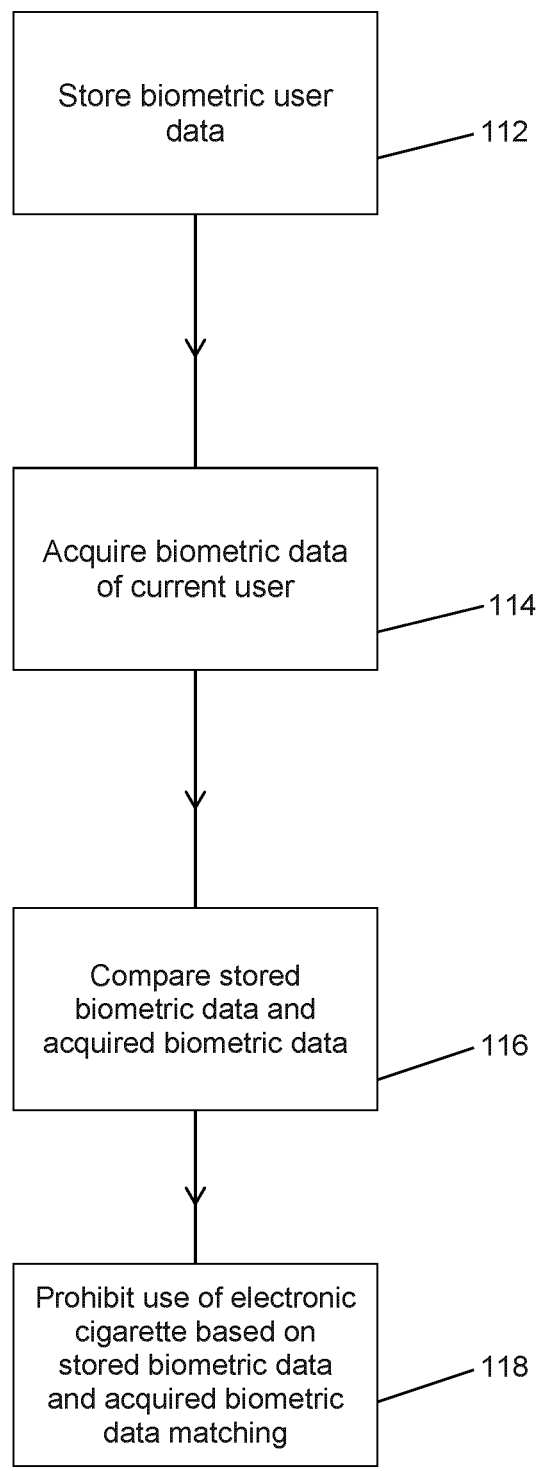
FIG. 4 shows a flow chart of third example method performed by an example electrical charger device.

In some examples the configurable rules may also include that to prohibit use of the electronic cigarette 10, biometric data of the user of the electronic cigarette must match user biometric data stored in the memory 16 of the electrical charger device 10. The process for carrying out this assessment is set out in FIG. 4. At step 112, user biometric data is stored. In this example the user biometric data is stored in memory 16 of the electrical charger device. This is achieved by user biometric data being scanned using the biometric sensor 18 of the electrical charger device, which in this example is a fingerprint sensor. This step is carried out when the electrical charger device is initially set up, or at some later time based on choices taken by the user.

At step 114, user biometric data is acquired from the current user of the electronic cigarette 20. This can be achieved by the current user providing biometric data at the biometric sensor 18 of the electrical charger device 10, or at a biometric sensor (not shown) on the electronic cigarette, which is then transmitted to the electrical charger device.

The acquired biometric data and the stored user biometric data are compared at step 116. If the comparison determines there the acquired biometric data and the stored user biometric data match (i.e. there is a positive match), then use of the electronic cigarette 20 is prohibited by the process set out above. When there is a negative match, this step is not taken allowing use of the electronic cigarette to continue. Additionally, or alternative, another step is may be taken.

Due to the electrical charger device 10 only being able to issue a command to prohibit use of the electronic cigarette 20 once a wireless communicative pairing has been established between the electronic cigarette and the electrical charge device in this example, the electrical charger device is only able to prohibit use of electronic cigarette when the distance between the electronic cigarette and the electrical charger device is below a threshold distance. The threshold distance is the wireless communication range of the electrical charge device.

Figure 5:
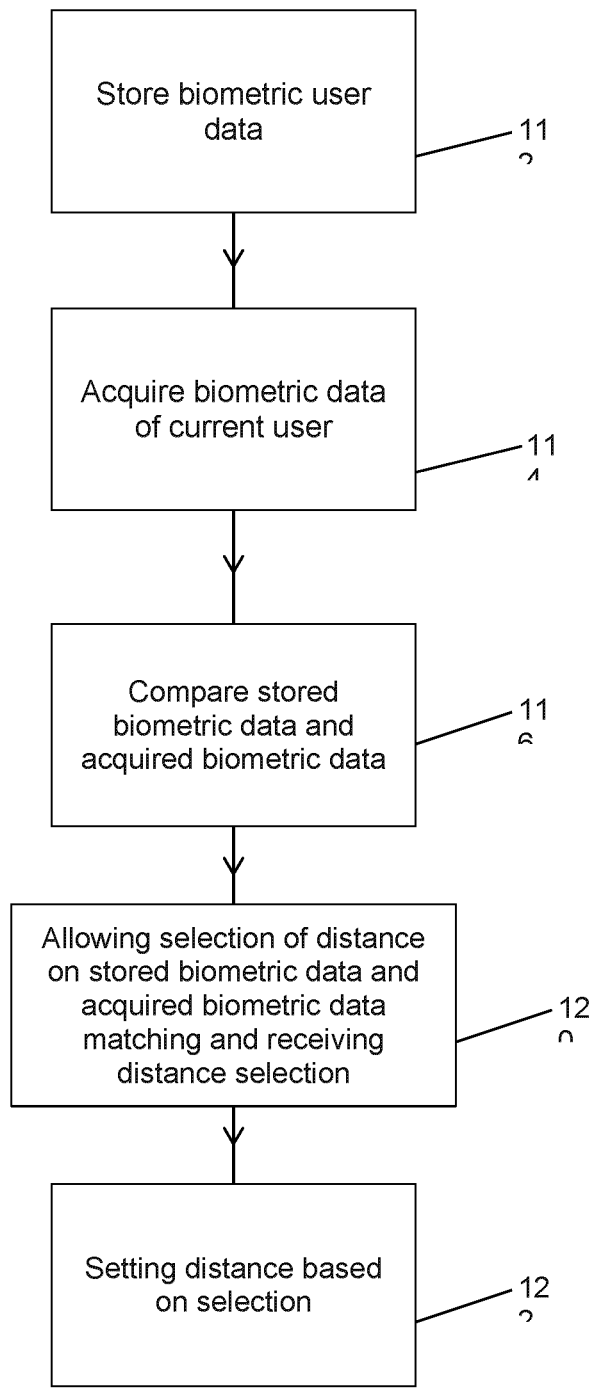
FIG. 5 shows a flow chart of a fourth example method performed by an example electrical charger device

The threshold distance can be adjusted. To achieve this, the process set out in FIG. 5 is carried out. In this example the first steps of this process are the same are as the process set out in FIG. 4. Accordingly, at step 112, user biometric data is stored. Biometric data is acquired from the current user of the electronic cigarette 20 at step 114. The acquired biometric data and the stored user biometric data are then compared at step 116. If the comparison determines there the acquired biometric data and the stored user biometric data match (i.e. there is a positive match), the user is able to select a distance at step 120. This may be achieved by presenting a user with options at an interface. The user thereby selects a distance. If there is a negative match, typically, the user is not able to select a distance, and an alternative option may be offered to the user, such as providing biometric data again for comparison.

At step 122 the user selected distance is set by the electrical charger device 10. In this example this is achieved by adjusting the power supplied to the wireless transceiver 12. To reduce the threshold distance, the amount of power supplied to the wireless transceiver is reduced. If the threshold distance is increased, the amount of power supplied to the wireless transceiver is increased.

Figure 6:
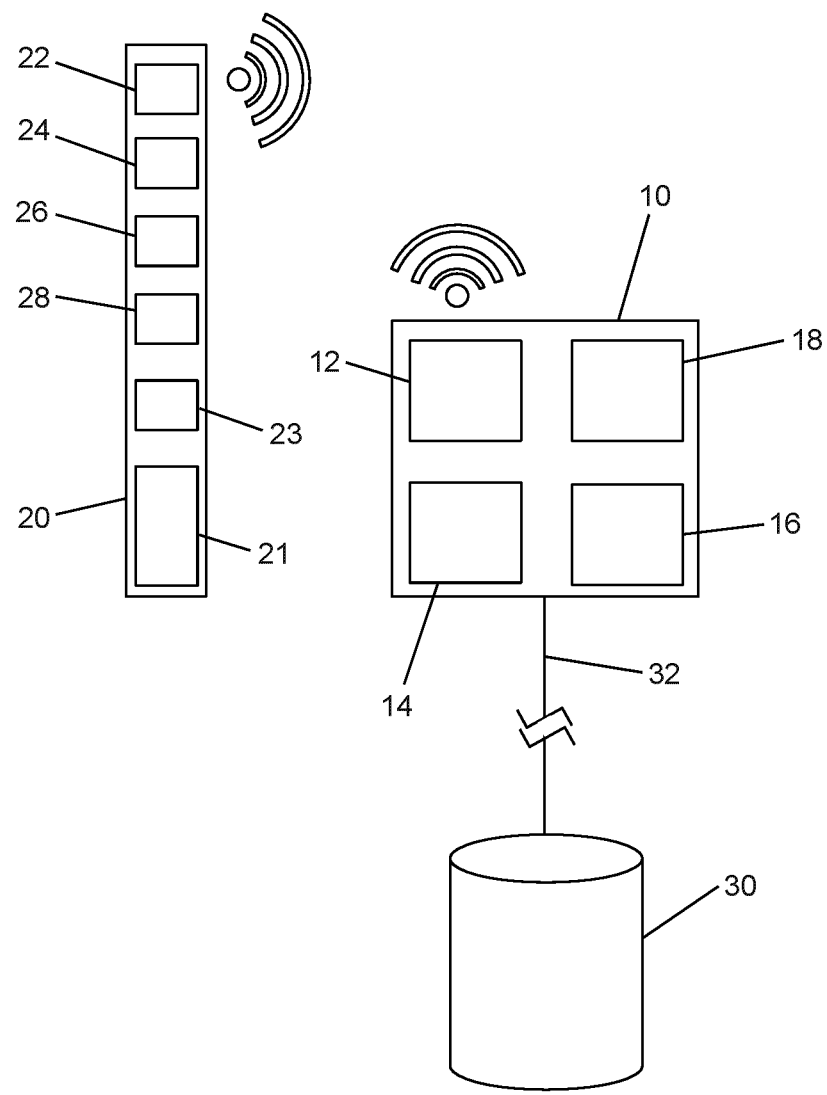
FIG. 6 shows a schematic of a second example electrical charger device and electronic cigarette.

In addition to the electrical charger device 10 being connectable to one or more electronic cigarettes 20, the electrical charger device is also able to be connected to other computing devices. Two such examples are now described in relation to FIG. 6 and FIG. 7. In FIG. 6 the electrical charger device with the same components as the electrical charger device shown in FIG. 1 is connected to a server 30 (i.e. one or more servers) as well as to an electronic cigarette 20.

The electrical charger device 10 is connected to the server 30 by a connection 32. This connection is able to be a wired connection or a wireless connection. Regardless of the connection type, the connection may be a direct connection (i.e. a connection only between the electrical charger device and server without any devices connected in between) or may be an indirect connection (i.e. a connection between the electrical charger device and the server with other devices connected in between, such as in a network).

Figure 7:
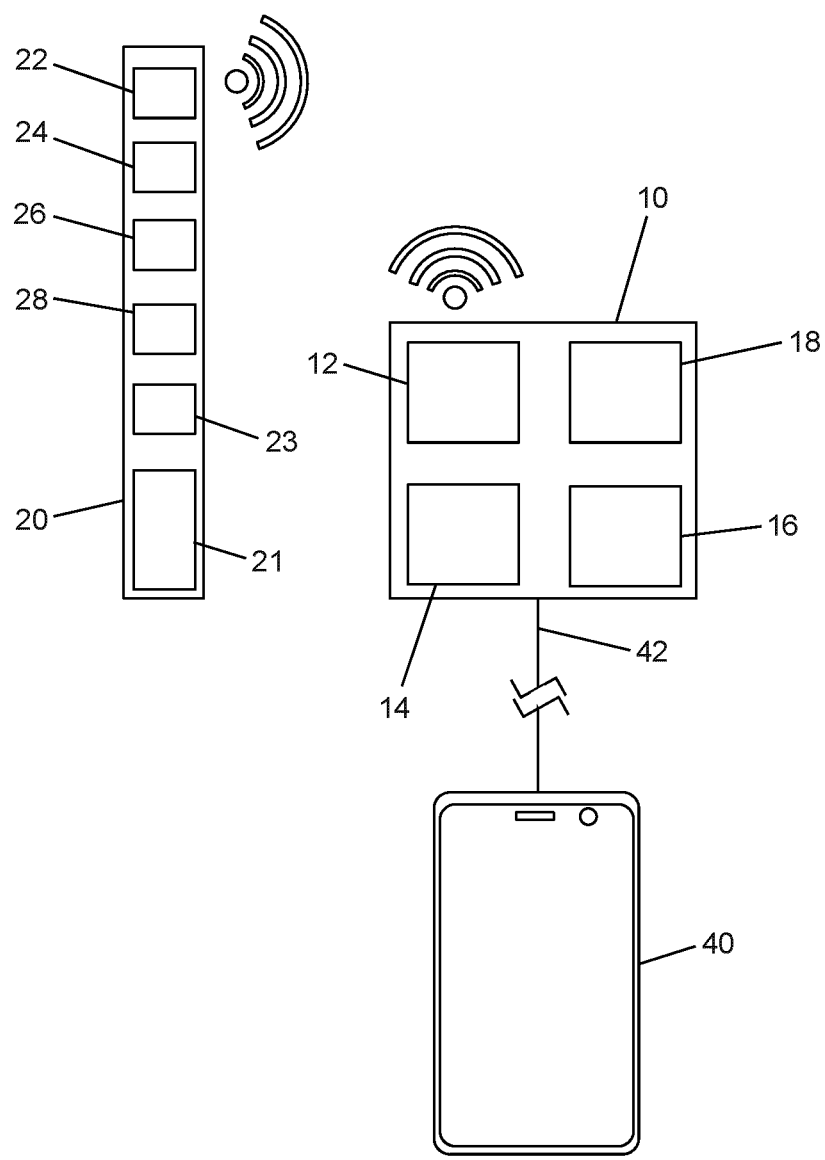
FIG. 7 shows a schematic of a third example electrical charger device and electronic cigarette.

In the example shown in FIG. 7, the electrical charger device 10 (again with the same components as the electrical charger device shown in FIG. 1) is connected to a mobile phone 40 as well as to an electronic cigarette 20. As with the example shown in FIG. 6, the electrical charger device 10 is connected to the mobile phone 40 by a connection 42. This connection is able to be a wired connection or a wireless connection. Regardless of the connection type, the connection may be a direct connection (i.e. a connection only between the electrical charger device and mobile phone without any devices connected in between) or may be an indirect connection (i.e. a connection between the electrical charger device and the mobile phone with other devices connected in between, such as in a network).

Of course, in examples where the electrical charge device 10 is connected to a mobile phone 40 or server 30, the connection can either be temporary or permanent. Further, the connection to the mobile phone or server is not dependent on the electrical charge device being in a wireless communicative pairing with an electronic cigarette 20, and neither is the wireless communicative pairing of the electrical charger device with an electronic cigarette dependent on a connection to a mobile phone or server.

In various examples the electrical charger device 10 may be a module of the mobile phone 40 thereby having a direction connection between the electrical charger device and the mobile phone. This may be achieved by software on the mobile phone, such as in a user application (also referred to as an "app"), emulating or otherwise taking the place of the hardware of an electrical charger device and using various components of the mobile phone to provide the components of the electrical charger device.

The connection to the computing device, such as the server 30 or mobile phone 40, allows additional data to be acquired at the data acquisition step. Additionally, data may be sent from the electrical charger device 10 to the computing device.

The data that may be retrieved from the computing device may include user related data, such as the user's age, gender, employment status and type, health statistics and any other data provided by or related to the user or their activities or schedule. Should the computing device by the mobile phone 40, the data may include the location of the mobile phone. This data retrieved from the computing device can be used in the configurable rules to further determine when to prohibit use of the electronic cigarette 20 and when to allow use of the electronic cigarette.

In examples where a mobile phone 40 is used, when a fingerprint or other biometric data is to be provided, the biometric data may be provided at the mobile phone instead of at the electrical charger device 10. This may be achieved by the mobile phone issuing a notification to a user that biometric data is requested at a sensor on the mobile phone in response to the electrical charger device providing a request to the mobile phone for biometric data input. When the user provides biometric data this can either be verified with biometric data stored on the mobile phone or biometric data stored on the electrical charge device. This input may be required for example when the electrical charger device requests verification that it is to prohibit use of electronic cigarette in a wireless communicative pairing with the electrical charge device. The step of the user providing biometric data and the mobile phone can also be replaced by the user being requested to enter a PIN code or press a button, which removes the need for biometric data.

Examples where a server 30 is used, an electrical charger device 10 may also request verification that use of an electronic cigarette is to be prohibited from the server. The server may provide a response based on information held at the server, such as user details, which may be compared to a registered owner of a respective electronic cigarette for example. The server may then respond to the electrical charge device with a confirmation as to whether or not use of the electronic cigarette is to be prohibited based on the information held at the server.

The electrical charger device 10 may provide information to the server 30 or mobile phone 40. In some examples, this information may include the ID tag of electronic cigarette 20 in a wireless communicative pairing with the electrical charger device along with a means of identifying the electrical charge device. This allows registration of which electronic cigarettes are used with which electrical charger devices.

In various examples, the electrical charger device 10 may send an ID tag for the respective electrical charger device to an electronic cigarette 20 in a wireless communicative pairing therewith. This may allow the electronic cigarette to carry out an assessment as to whether or not a command received to prohibit use of electronic cigarette is to be applied. This decision may be based on whether or not the electronic cigarette recognises the electrical charger device (i.e. whether the received ID tag matches and ID tag for electrical charger device and stored in the memory 28 of the electronic cigarette). Should the electrical charger device not be recognised by electronic cigarette, the command to prohibit use of electronic cigarette may be disregarded.

There are occasions when the owner of an electronic cigarette and/or electrical charger device may change. As such, it is possible to update, either by replacement or addition, ID tags stored either on the electrical charger device 10 and/or the electronic cigarette 20. Additionally, or alternatively, it is possible to update, either by replacement or addition, user biometric data stored either on the electrical charger device and/or the electronic cigarette.

In addition to the processes and procedures set out in relation to the various examples above, the electrical charger device 10 is of course also capable of providing charging to the electronic cigarette 20. This may be achieved by a wired or wireless connection between the electrical charge device and an electronic cigarette. Should the charging be applied wirelessly, this may be achieved using the wireless communicative pairing. In examples where the charging is provided by a wired connection, this may be achieved using a cable connected between the electrical charger device and electronic cigarette or may be achieved by a port and socket arrangement on the electronic cigarette and electrical charge device.

Of course, the electrical charge device 10 may be connected to one or more electronic cigarettes 20 at any one time, and anyone electronic cigarette may be connected to electrical charge devices at any one time. This can either be for charging purposes or for establishing a wireless communicative pairing to control use of each electronic cigarette.

The invention claimed is:

1. An electrical charger device, comprising:
an interface configured to establish a wireless communicative pairing between the electrical charger device and an electronic cigarette, the wireless communicative pairing being establishable when the electronic cigarette and the electrical charger device are within communication range of one another; and
a controller configured to:
acquire data related to the electronic cigarette, and
prohibit use of the electronic cigarette based on the acquired data and configurable rules, wherein the configurable rules include prohibiting use of the electronic cigarette based on a distance between the electronic cigarette and the electrical charger device.

2. The device according to claim 1, wherein the controller is configured to prohibit use of the electronic cigarette if the distance is below a predetermined threshold.

3. The device of claim 1, wherein the acquired data comprises an identifier associated with the electronic cigarette, and the controller is configured to compare the acquired identifier with an identifier stored in memory in the electrical charger device.

4. The device according to claim 3, wherein the controller being configured to prohibit use of the electronic cigarette is based on the acquired identifier matching the identifier stored in memory in the electrical charger device.

5. The device according to claim 3, further comprising the controller being configured to send a message to a computing device based on the comparison.

6. The device according to claim 5, wherein the computing device is a mobile phone or a server.

7. The device according to claim 3, wherein the identifiers stored in memory comprise identifiers for electronic cigarettes authorised for use with the electrical charger device.

8. The device according to claim 1, wherein the controller is configured to prohibit use of the electronic cigarette when the electrical charger device is in a first mode, and wherein the controller is further configured to:
store user biometric data;
acquire biometric data from a user seeking to charge the electronic cigarette;
establish whether the acquired biometric data matches the stored user biometric data; and
activate the first mode based on a result of the match.

9. The device according to claim 1, wherein the controller is further configured to:
store user biometric data;
acquire biometric data from a user seeking to charge the electronic cigarette;
establish whether the acquired biometric data matches the stored user biometric data;
allow selection, by a user and based on a result of the match, of a threshold distance within which to prohibit use;
receive the threshold distance selection; and set the threshold distance based on the received threshold distance.

10. The device according to claim 8, wherein the biometric data comprises a fingerprint.

11. The device of claim 8, wherein the controller is further configured to update the stored user biometric data when a user of the electronic cigarette and/or electrical charger device is changed.

12. The device of claim 8, wherein the controller is further configured to send an identifier associated with the electrical charger device to the electronic cigarette.

13. The electrical charger device according to claim 1, further comprising a biometric sensor configured to receive user biometric data.

14. A method performed by an electrical charger device for an electronic cigarette, the method comprising:
  establishing a wireless communicative pairing establishable when the electronic cigarette and the electrical charger device are within communication range of one another;
  acquiring data related to the electronic cigarette; and
  prohibiting use of the electronic cigarette based on the acquired data and configurable rules, wherein the configurable rules include prohibiting use of the electronic cigarette based on a distance between the electronic cigarette and the electrical charger device.

15. An electrical charger device, comprising:
  an interface configured to establish a wireless communicative pairing between the electrical charger device and an electronic cigarette, the wireless communicative pairing being establishable when the electronic cigarette and the electrical charger device are within communication range of one another; and
  a controller configured to:
    acquire data related to the electronic cigarette, and
    prohibit use of the electronic cigarette based on the acquired data and configurable rules,
    store user biometric data,
    acquire biometric data from a user seeking to charge the electronic cigarette,
    establish whether the acquired biometric data matches the stored biometric data,
    activate the first mode based on a result of the match or when the electrical charger device is in a first mode, and
    prohibit use of the electronic cigarette when the electrical charger device is in the first mode.

16. The device according to claim 15, wherein the biometric data comprises a fingerprint.

17. The device of claim 15, wherein the controller is further configured to update the stored user biometric data when a user of the electronic cigarette and/or electrical charger device is changed.

18. The device of claim 15, wherein the controller is further configured to send an identifier associated with the electrical charger device to the electronic cigarette.

19. The electrical charger device according to claim 1, further comprising a biometric sensor configured to receive user biometric data.

\* \* \* \* \*